United States Patent
Chou et al.

(10) Patent No.: US 8,030,563 B2
(45) Date of Patent: Oct. 4, 2011

(54) ELECTRONIC AUDIO PLAYING APPARATUS AND METHOD

(75) Inventors: Hsiao-Chung Chou, Taipei Hsien (TW); Li-Zhang Huang, Taipei Hsien (TW); Chuan-Hong Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 199 days.

(21) Appl. No.: 12/422,303

(22) Filed: Apr. 13, 2009

(65) Prior Publication Data

US 2010/0180753 A1    Jul. 22, 2010

(30) Foreign Application Priority Data

Jan. 16, 2009 (CN) .......................... 2009 1 0300246

(51) Int. Cl.
   *G10H 1/00*    (2006.01)
(52) U.S. Cl. .......................... 84/602; 84/601
(58) Field of Classification Search ............. 84/600–602
    See application file for complete search history.

(56) References Cited

U.S. PATENT DOCUMENTS

| | | | | |
|---|---|---|---|---|
| 5,410,097 A * | 4/1995 | Kato et al. | ...................... | 84/610 |
| 5,655,058 A * | 8/1997 | Balasubramanian et al. | | 704/255 |
| 5,705,762 A * | 1/1998 | Kang et al. | ...................... | 84/610 |
| 5,742,736 A * | 4/1998 | Haddock | ...................... | 704/270 |
| 5,854,619 A * | 12/1998 | Kato | .............................. | 345/23 |
| 7,017,120 B2 * | 3/2006 | Shnier | .......................... | 715/783 |
| 7,116,891 B2 * | 10/2006 | Borden, IV | ..................... | 386/343 |
| 7,421,656 B2 * | 9/2008 | Fong et al. | ..................... | 715/716 |
| 7,473,839 B2 * | 1/2009 | Gimarc | .......................... | 84/601 |
| 7,851,688 B2 * | 12/2010 | Compton | ........................ | 84/610 |
| 2002/0120925 A1 * | 8/2002 | Logan | ................................ | 725/9 |
| 2002/0180774 A1 * | 12/2002 | Errico et al. | ................... | 345/721 |
| 2003/0033502 A1 * | 2/2003 | Matsuzaki | ..................... | 712/200 |
| 2003/0093790 A1 * | 5/2003 | Logan et al. | ..................... | 725/38 |
| 2003/0226151 A1 * | 12/2003 | Hamada et al. | ................. | 725/132 |
| 2003/0228131 A1 * | 12/2003 | Miyazawa | ........................ | 386/46 |
| 2005/0146534 A1 * | 7/2005 | Fong et al. | ..................... | 345/619 |
| 2005/0204385 A1 * | 9/2005 | Sull et al. | .......................... | 725/45 |
| 2005/0249080 A1 * | 11/2005 | Foote et al. | ................... | 369/59.1 |
| 2006/0031870 A1 * | 2/2006 | Jarman et al. | .................... | 725/25 |
| 2006/0209641 A1 * | 9/2006 | Navid | .......................... | 369/30.06 |
| 2007/0098351 A1 * | 5/2007 | East et al. | ........................ | 386/46 |
| 2007/0198111 A1 * | 8/2007 | Oetzel et al. | ..................... | 700/94 |
| 2008/0034029 A1 * | 2/2008 | Fang et al. | ........................ | 709/203 |
| 2008/0295672 A1 * | 12/2008 | Compton | ........................ | 84/605 |
| 2009/0077467 A1 * | 3/2009 | Adappa et al. | ................. | 715/719 |
| 2009/0093278 A1 * | 4/2009 | Negron et al. | ................. | 455/567 |

(Continued)

FOREIGN PATENT DOCUMENTS

JP   2005352022 A * 12/2005

*Primary Examiner* — David S. Warren
(74) *Attorney, Agent, or Firm* — Altis Law Group, Inc.

(57) ABSTRACT

An audio playing method is provided. The method includes: accessing an audio file from a data storage; transmitting the audio file to a decoder to decode and outputting the decoded audio file through the audio output unit; determining whether a skipping command is received from an input unit; determining the desired section according to the received skipping command if the skipping command is received from the input unit; accessing the starting address of the desired section from the control part, and playing the main audio part from the starting address.

6 Claims, 4 Drawing Sheets

U.S. PATENT DOCUMENTS

| | | | |
|---|---|---|---|
| 2009/0198357 A1* | 8/2009 | Logan et al. | 700/94 |
| 2009/0228798 A1* | 9/2009 | Kephart et al. | 715/727 |
| 2009/0248182 A1* | 10/2009 | Logan et al. | 700/94 |
| 2009/0258677 A1* | 10/2009 | Ellis et al. | 455/556.1 |
| 2009/0281908 A1* | 11/2009 | Wong | 705/26 |
| 2010/0004768 A1* | 1/2010 | Dunning et al. | 700/94 |
| 2010/0131866 A1* | 5/2010 | Nielsen et al. | 715/758 |
| 2010/0141655 A1* | 6/2010 | Belinsky et al. | 345/440 |
| 2010/0153114 A1* | 6/2010 | Shih et al. | 704/260 |
| 2010/0162344 A1* | 6/2010 | Casagrande et al. | 725/137 |
| 2010/0175088 A1* | 7/2010 | Loebig et al. | 725/40 |
| 2010/0180753 A1* | 7/2010 | Chou et al. | 84/602 |
| 2010/0186579 A1* | 7/2010 | Schnitman | 84/625 |
| 2010/0198375 A1* | 8/2010 | Rottler et al. | 700/94 |

* cited by examiner

| Control Point | Control Point 1 | Control Point 2 | ... | Control Point N |
|---|---|---|---|---|
| Starting Address | XXXX | XXXX | ... | XXXX |

FIG. 3

ELECTRONIC AUDIO PLAYING APPARATUS AND METHOD

BACKGROUND

1. Technical Field

The present disclosure relates to an electronic audio playing apparatus and a method thereof.

2. Description of Related Art

Generally, audio files can only be played from the beginning. Electronic playing apparatuses such as MP3 players only provide a skipping operation for users to advance or reverse to a next audio file.

Therefore, what is needed is an electronic audio playing apparatus and method that allows a user to start at any desired point in an audio file.

BRIEF DESCRIPTION OF THE DRAWINGS

The components of the drawings are not necessarily drawn to scale, the emphasis instead being placed upon clearly illustrating the principles of the electronic audio playing apparatus and the method thereof. Moreover, in the drawings, like reference numerals designate corresponding parts throughout several views.

FIG. 3 is a schematic diagram of a control part of the audio file in FIG. 2, in accordance with an exemplary embodiment.

DETAILED DESCRIPTION

Figure 1:
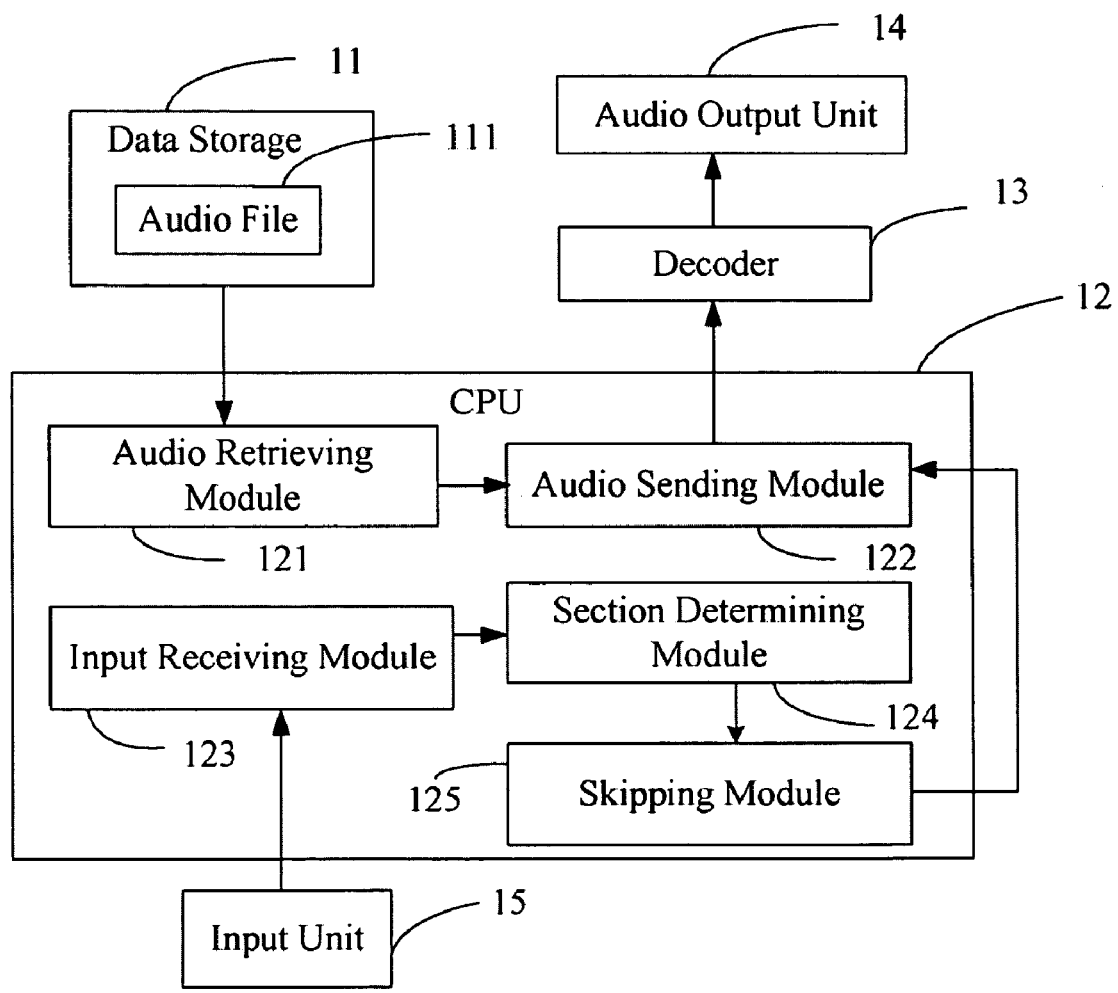
FIG. 1 is a block diagram of an electronic audio playing apparatus in accordance with an exemplary embodiment.
Figure 2:
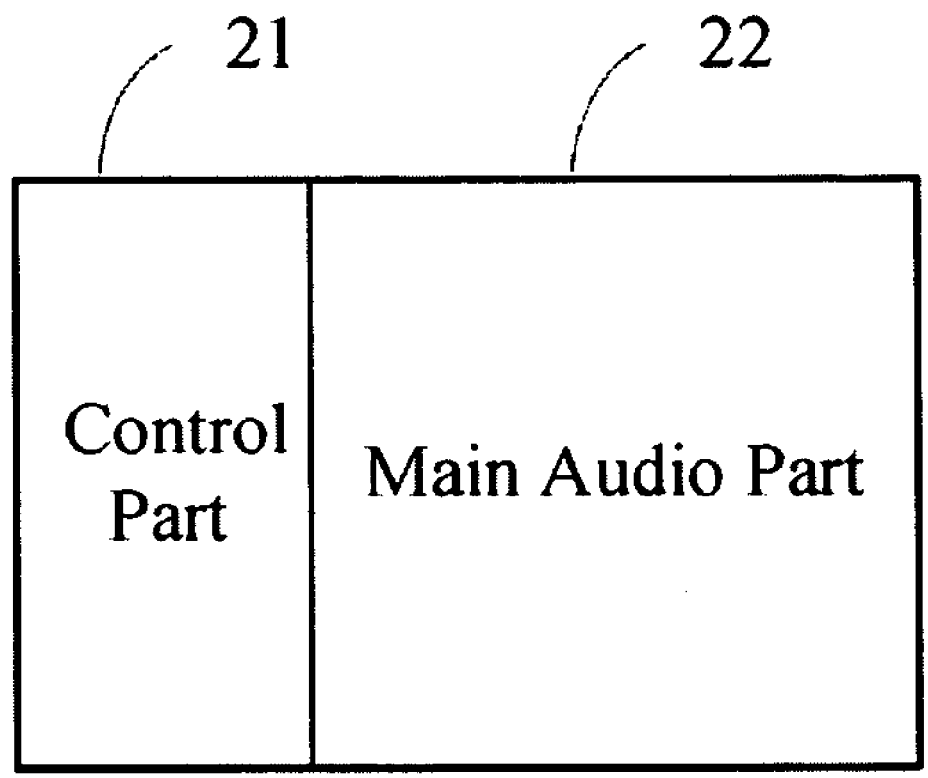
FIG. 2 is a block diagram of structure of an audio file, in accordance with an exemplary embodiment.

FIG. 1 is a block diagram of an electronic audio playing apparatus in accordance with an exemplary embodiment. The electronic audio playing apparatus may be an MP3 player, mobile phone with MP3 player, etc. The apparatus includes a data storage 11, a central processing unit (CPU) 12, a decoder 13, an audio output unit 14, such as a speaker or a earphone, and a user input unit 15 for receiving skipping commands. The data storage 11 stores at least an audio file 111. The audio file includes a control part 21 and a main audio part 22, as shown in FIG. 2. In another exemplary embodiment, the control part 21 can be stored in the data storage 11 as a separate file. The main audio part 22 may comprise any kind of audio content, such as a story, a song, etc. The main audio part 22 is divided into a plurality of sections. The control part 21 is a kind of metadata that describes the structure of the main part comprising control point data. Each of the control points is a starting address of each section of the main audio part 22 and is assigned an identification number, as shown in FIG. 3.

The CPU 12 includes an audio retrieving module 121, an audio sending module 122, an input receiving module 123, a section determining module 124, and a skipping module 125. The audio retrieving module 121 is for retrieving the audio file 111 in the data storage 11. The audio sending module 122 is for transmitting the audio file 111 to the decoder 13 for decoding. The decoded audio file 111 is output from the audio output unit 14. The input receiving module 123 is for receiving and determining which, if any, skipping commands are received from the input unit 15 during play of the main part 21 of the audio file 111. In this embodiment, skipping commands include skip forward to next section, skip backward to previous section, skip-to-first section, and skip-to-last section. If one of the skipping commands is received from the input unit 15, the section determining module 124 determines which section to skip to, namely, a desired section.

In the exemplary embodiment, the input unit 15 is configured with a plurality of section skipping buttons respectively associated with the skipping commands.

In the exemplary embodiment, the audio sending module 122 records the ID number of the section of the audio file 111 currently being played. Accordingly, the section determining module 124 determines the desired section according to the ID number of section currently being played and the received skipping commands. For example, supposing the ID number of the section currently being played is "2," and the skipping command from the input unit 15 is a "skip forward to next section" command, the section determining module 124 determines the ID number of the desired section is "3."

In another exemplary embodiment, the skipping commands further comprises a "skip to desired section" command which is that the user directly input the ID number of the desired section through the input unit 15. Therefore, the section determining module 124 directly receives and recognizes the ID number of the desired section input by the user.

The skipping module 125 obtains the starting address of the desired section from the control part 21 according to the ID number thereof and notifies the audio sending module 122 to transmit the audio file 111 to the decoder 13 from the obtained starting address. For example, if the ID number of the desired section is "3," the skipping module 125 obtains the starting address from the control point whose ID number is "3" in control part 21, and notifies the audio sending module 122 to transmit the audio file 111 to decoder 13 beginning from the obtained starting address.

If the determined ID number of the desired section is greater than the total number of the sections of the main audio part 22, the section determining module 124 takes the last section of the main audio part 22 as the desired section. After the last section of the main audio part 22 is played, the audio file retrieving module 121 achieves another audio file 111 next to the audio file 111 just played to play.

Figure 4:
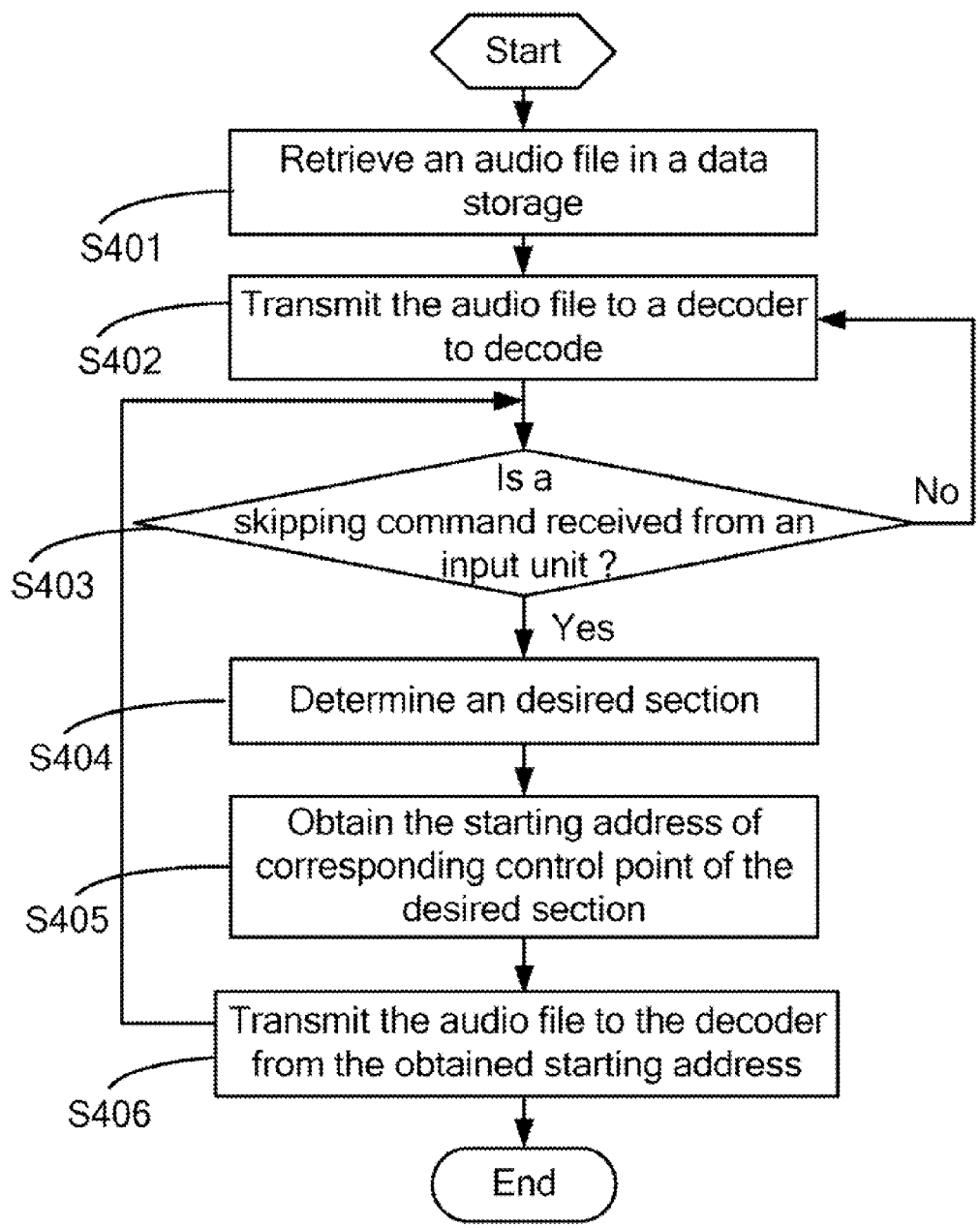
FIG. 4 is a flowchart of an audio playing method applied to the electronic audio playing apparatus of FIG. 1, in accordance with an exemplary embodiment.

FIG. 4 is a flowchart of an audio playing method, in accordance with an exemplary embodiment, applied to the electronic audio playing apparatus of FIG. 1. In step S401, The audio file retrieving module 121 retrieves the audio file 111 in the data storage 11.

In step S402, the audio sending module 122 transmits the audio file 111 to the decoder 13 for decoding and the audio output unit 14 outputs the audio file 111 decoded by the decoder 13.

In step S403, the input receiving module 123 receives and determines which, if any, skipping command is received from the input unit 15 during play of the main part 21 of the audio file 111.

In step S404, if one of skipping command is received from the input unit 15, the section determining module 124 determines the desired section.

In step S405, the skipping module 125 obtains the starting address of the desired section according to the ID number of the desired section from the control point of the control part 21.

In step S406, the skipping module 125 notices the audio sending module 122 to transmit the audio file 111 to decoder 13 from the obtained starting address.

Although the present disclosure has been specifically described on the basis of preferred embodiments, the invention is not to be construed as being limited thereto. Various changes or modifications may be made to the embodiment without departing from the scope and spirit of the invention.

What is claimed is:

1. An electronic audio playing apparatus comprising:
a data storage for storing at least one audio file, wherein each of the at least one audio file comprises a control part and a main audio part, the main audio part is divided into a plurality of sections, the control part is a kind of metadata that describes the structure of the main part comprising control point data, each of which is a starting address of one of the sections of the main audio part;
an audio file retrieving module for retrieving the at least one audio file in the data storage;
an audio sending module for transmitting the at least one audio file to a decoder for decoding;
an output unit for outputting the decoded audio file;
an input receiving module for determining whether a skipping command is received from an input unit;
an section determining module for determining an desired section according to the received skipping command if one of skipping command is received from the input unit; and
a skipping module for obtaining the starting address of the desired section from the control point of the control part, and notifying the audio sending module to transmit the audio data to the decoder from the obtained starting address;
wherein the skipping command is a command which comprises an identification (ID) number of the desired section which the user directly input through the input unit, the section determining module is further for determining whether the ID number of the desired section is greater than the total number of sections of the main audio part, if the determined ID number of the desired section is greater than a total number of sections of the main audio part, a last section of the main audio part is taken as the desired section.

2. The electronic audio playing apparatus as described in claim 1, wherein the control part is stored in the data storage as a separate file.

3. The electronic audio playing apparatus as described in claim 1, wherein each section of the main audio part is assigned the identification (ID) number corresponding to the starting address of the section, the audio sending module obtains the ID number of a section currently being played of the main audio part, the skipping commands comprising a skip forward to next section, and a skip backward to previous section, and the section determining module determines the desired section according to the obtained ID number of the section currently being played and the received skipping commands.

4. An audio playing method applied to an electronic audio playing apparatus, comprising:
providing a data storage for storing at least one audio file, wherein the audio file comprises a control part and a main audio part, the main audio part is divided into a plurality of sections, the control part is a kind of metadata that describes the structure of the main part comprising control point data each of which is a starting address of one of the sections of the main audio part;
retrieving the audio file in the data storage;
transmitting the audio file to a decoder for decoding;
outputting the decoded audio file through an output unit;
determining which kind of skipping command is received from an input unit;
determining an desired section according to the received skipping command if one of skipping command is received from the input unit, wherein a last section of the audio file is taken as the desired section if a number of the desired section is greater than a total number of sections of the main audio part; and
obtaining the starting address of the desired section from the control point in the control part, and transmitting the audio data to the decoder from the obtained starting address.

5. The audio playing method as described in claim 4, wherein the control part is stored in the data storage as a separate file.

6. The audio playing method as described in claim 4, wherein each section of the main audio part is assigned an identification (ID) number and the skipping commands comprising a skip forward to next section, and a skip backward to previous section, the method further comprises obtaining the ID number of a section currently being played of the main audio part, and the desired section is determined according to the obtained ID number of the section currently being played and the received skipping commands.

* * * * *